Patented Jan. 17, 1933

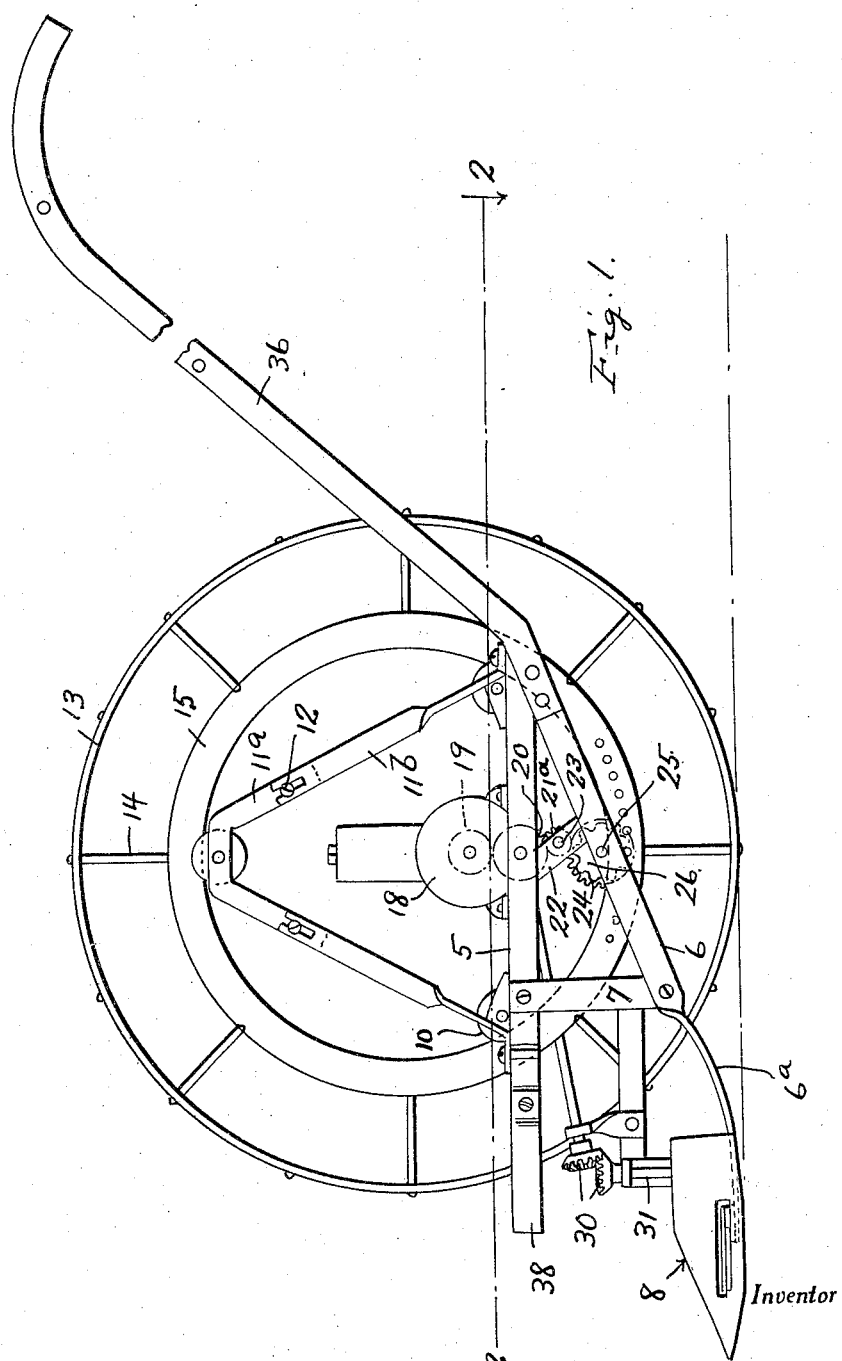

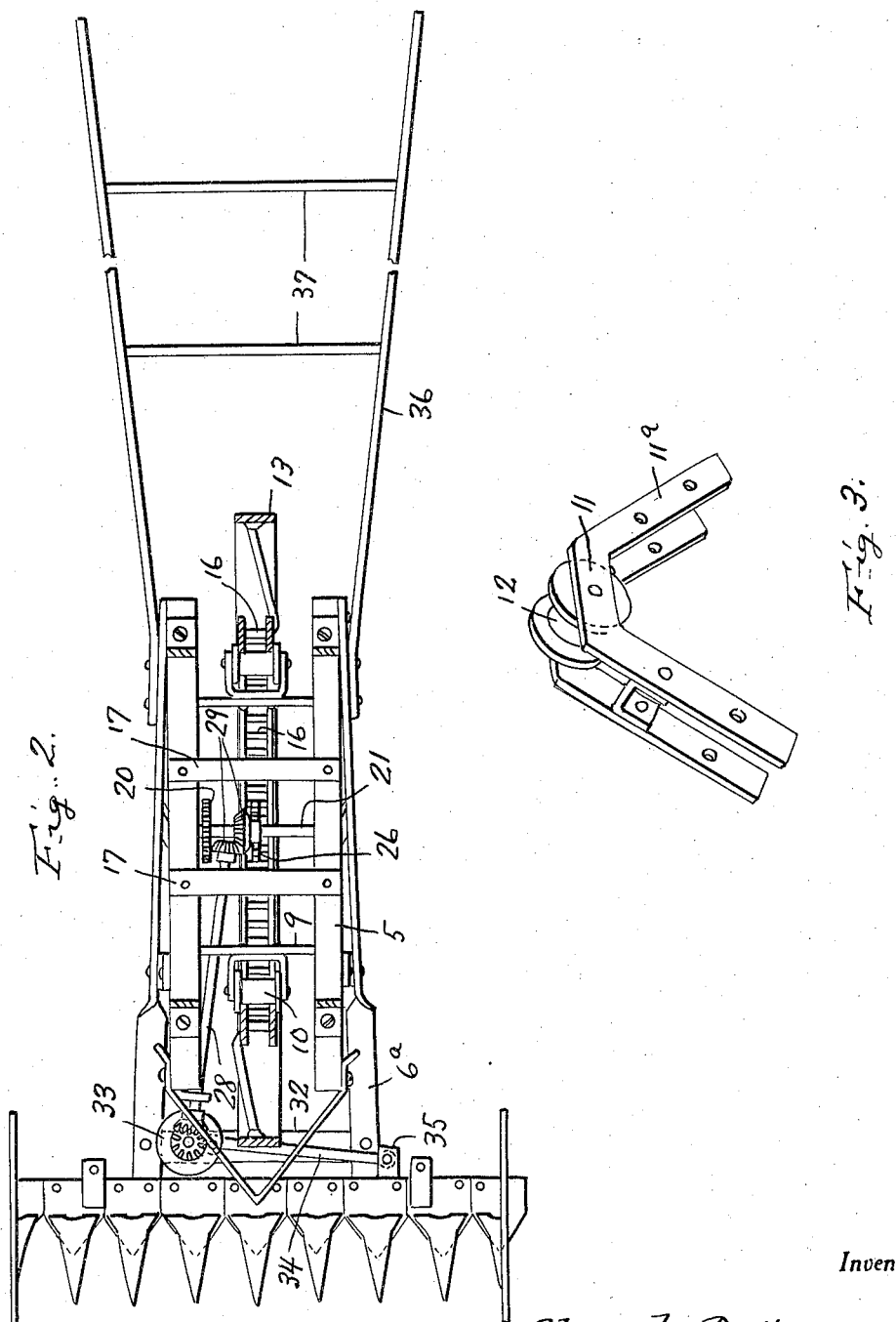

1,894,312

UNITED STATES PATENT OFFICE

SLINGSBY D. HARMAN, OF WOODHULL, ILLINOIS

POWER MOWER

Application filed March 7, 1932. Serial No. 597,355.

This invention relates to mowing machines and in accordance with the present invention a mower is provided that is especially adapted for mowing weeds in such places as are hard or impossible to gain access with either a hand or a draft drawn mowing machine as now employed. In the employment of these latter mowing machines, it is often necessary to cut the weeds with a scythe because of the impossibility of using the horse drawn mower due to the limited space.

In accordance with the present invention a mower is provided whereby the need of manual cutting of the weeds is eliminated and the only manual effort required is in the guiding of the mowing machine.

A machine embodying the features of the invention will be found very desirable for mowing weeds along highways, railroads, right of ways and adjacent to fences and similar structure.

The invention together with its numerous objects and advantages will be best understood from a study of the following description taken in connection with the accompanying drawings wherein:

Figure 1 is a side elevational view of the machine.

Figure 2 is a horizontal view taken substantially on line 2—2 of Figure 1, and

Figure 3 is a perspective view of the upper end portion of a roller supporting structure.

Referring more in detail to the drawings it will be seen that my improved power driven mower comprises a frame consisting of a pair of relatively spaced parallel side bars 5. Extending forwardly from the rear ends of the bars 5 are inclined bars 6 which adjacent their forward ends are twisted, and continued forwardly and longitudinally curved as at 6a. Adjacent the end 6a the bars 6 are supported from the side bars 5 through the medium of vertical suspension bars 7.

The ends 6a of bars 6 support therebetween a transversely disposed conventional mower bar structure designated as a whole by the reference character 8. Mechanism for operating the reciprocably mounted sickle bar of the structure 8 will be hereinafter more fully referred to and detailed.

Bars 5 adjacent their corresponding ends are connected by cross bars 9 each of which intermediate its ends is provided with a substantially U-shaped bracket within which is journalled a roller 10.

Rising from each bar 5 is a substantially inverted V shaped bracket 11 which brackets 11 support between their upper ends a flange roller 12. Each bracket 11 is preferably longitudinally extensible, the sides of the bracket each consisting of a pair of sections 11a, 11b, and the corresponding ends of the sections are adjustably connected together through the medium of a bolt 12 engaged in a selected one of several openings in the side sections 11a and engaging a slot in the associated section 11b and as is thought apparent from a study of Figures 2 and 3.

Supporting the aforementioned frame structure is a single relatively large traction wheel, the spokes 14 of which at their inner ends are alternately connected to a pair of relatively large rings 15. The rings 15 are connected by a circular series of relatively spaced pins 16, the rings 15 and pins 16 thus being in effect a gear construction.

A pair of bars 17 extending between the intermediate portions of the bars 5 support a prime mover 18 which may be an electric, gasoline or any other type of motor.

The motor 18 is equipped with a driven gear 19 meshing with a gear 20 provided on a shaft 21 supported between the bars 5. Gear 20 in turn meshes with a pinion 21a provided on a shaft supported between inclined braces 22 each of which braces 22 serve to brace an intermediate portion of a bar 6 with respect to a bar 5. A second gear similar to the gear 21a is also mounted on the shaft 23 and in mesh with a gear 24 provided on a shaft 25 supported between the bars 6. Shaft 25 is also equipped with a toothed wheel 26 which engages the pins 16, and it is apparent that through the medium of the gear arrangement just mentioned power is transmitted from the motor 18 through the gear formed by the rings 15 and teeth 16 to thereby drive the traction wheel 13.

For driving the sickle bar of the mower structure 8 there is provided a suitably mounted shaft 28 driven from shaft 21 through the medium of gearing 29 and connected by beveled gearing 30 to a vertical shaft 31 that is suitably supported in bearings mounted on a bar 32 connecting the end 6a of bars 6. Suitably mounted on the shaft 31 is a disk 33 to which is eccentrically connected one end of a pitman rod 34 which at its other end is connected to the sickle bar of the mower structure 8 in a well known manner and as indicated at 35. Thus it will be seen that the drive from the motor 18 will be utilized for reciprocating the sickle bar of the mower.

Handle bars 36 extend upwardly and rearwardly from the rear ends of the bars 6, and the handle members 36 are braced with respect to one another through cross rods 37.

From the foregoing it will be seen that the operator will walk behind the mower machine, utilizing the handles 36 for guiding it. The motor 18 will drive the wheel 13 for traction purposes and power from the motor will be transmitted to the sickle bar for reciprocating it. Obviously the machine may be readily manipulated and controlled during its course of travel to obtain maximum service.

The bars 5 at their forward ends are connected by a substantially V-shaped forwardly extending guard 38. The guard 38 terminates rearwardly of the sickle bar and serves to spread the weeds and keep them away from and out of the path of the wheel, and also serve to prevent the weeds from becoming entangled in any of the moving parts of the machine.

Even though I have herein shown and described the preferred embodiment of the invention it is to be understood that the same is susceptible of further changes, modifications and improvements coming within the scope of the appended claims.

Having thus described my invention, what I claim as new is:

1. A mower machine comprising in combination a frame, a plurality of rollers supported on the frame in substantially triangular relation, a sickle bar mounted on said frame adjacent the forward end thereof, a wheel having an annular part engaged on its inner side by said rollers, a prime mover mounted on said frame, a drive connection between said prime mover and the annular part of said wheel for driving the latter and additional driving means connecting the prime mover with the sickle bar for reciprocating it.

2. A mower machine comprising in combination a sickle bar, a substantially triangular frame vertically mounted rearwardly of the sickle bar, flanged rollers mounted on said frame adjacent each corner thereof, and a traction wheel provided with an annular ring engaging said rollers between the flanges of the rollers.

3. A mowing machine of the class described comprising in combination a frame, a cutting device supported adjacent the forward end of the frame and including a reciprocating sickle bar, a guard disposed above said mowing device and projecting forwardly from said frame, handle bars extending upwardly and rearwardly from the frame, a pair of relatively spaced rollers supported between opposite sides of said frame, a third roller supported above the first mentioned rollers intermediate said first mentioned rollers, supporting means for said third roller, a traction wheel supported by said rollers and including a ring like gear structure engaging the peripheries of said rollers, a motor supported on said frame, reduction gearing connecting said motor with said ring gear structure of said wheel for driving said wheel, and gear means connecting said motor with the reciprocatory sickle bar for driving the latter.

In testimony whereof I affix my signature.

SLINGSBY D. HARMAN.